May 21, 1968  H. BRECHNA ET AL  3,384,849
CRYOGENIC FLUX CONCENTRATOR

Filed May 27, 1966  3 Sheets-Sheet 1

INVENTOR.
HABIB BRECHNA
DAVID A. HILL
BY

INVENTOR.
HABIB BRECHNA
DAVID A. HILL 3,384,849
				Patented May 21, 1968

3,384,849
CRYOGENIC FLUX CONCENTRATOR
Habib Brechna, Paris, France, and David A. Hill, Summit, N.J., assignors to the United States of America as represented by the United States Atomic Energy Commission
Filed May 27, 1966, Ser. No. 554,290
4 Claims. (Cl. 335—299)

ABSTRACT OF THE DISCLOSURE

A flux concentrator magnet having primary and secondary windings for producing a high magnetic field in the bore thereof having stacked discs forming radial slits sequentially spaced in progressive rotation from each other, and having removable, pre-fabricated coils between each disc.

---

This invention relates to a flux concentrator magnet and more particularly to a cryogenic flux concentrator magnet having a primary winding and an inner secondary winding which interact to produce a higher field in the bore of the secondary winding than produced in the bore of the primary winding alone. This invention was made in the course of, or under a contract with the United States Atomic Energy Commission.

In the field of physics it is desired to use flux concentrators in the production of high magnetic fields. Various methods and apparatus have been made and used to this end such as the systems employing a hollow metallic, secondary, cylindrical flux concentrator, wrapped around with a number of primary conductor turns in which a high frequency voltage has been applied. While these systems have been useful and have produced the desired flux concentration, the coupling between the primary and secondary elements has been low because a very large amount of the applied ampere turns to the flux concentrator is wasted in fringing fields. It is also advantageous to provide versatility for a wide variety of pulse durations, applications, magnetic field strengths, and power sources.

In accordance with this invention, there is provided method and apparatus for flux concentration having a high primary to secondary coupling for efficiently producing high magnetic fields from 100 koe. up to 150 koe. or more. The method and construction involved in this invention utilizes standard and well known techniques and apparatus and is highly flexible for a wide range of applications, power sources, magnetic fields, frequencies, field shapes and pulse durations and lengths. More particularly, this invention contemplates a plurality of secondary discs with rotated radial slits and pre-fabricated coils for each disc whereby the discs can be put together in any shape desired. Moreover, the number of turns and the primary winding can be matched to any power supply because this configuration is not dependent on grooves in the metallic cylinder.

It is an object of this invention, therefore, to provide a method and apparatus for flux concentration to produce a high magnetic field;

It is another object to provide a flux concentrator with a high primary to secondary coupling;

It is another object to provide a flux concentrator with versatility for a wide range of magnetic fields, pulse length durations, applications, and power sources;

Still another object of this invention is provision for simple, efficient, interchangeable, pre-fabricated components.

The above and further novel features and objects of this invention will appear more fully from the following detailed description when the same is read in connection with the accompanying drawings. It is to be expressly understood, however, that the drawings are not intended as a definition of the invention but are for purposes of illustration only.

In the drawings where like elements are referenced alike:

Figure 4:
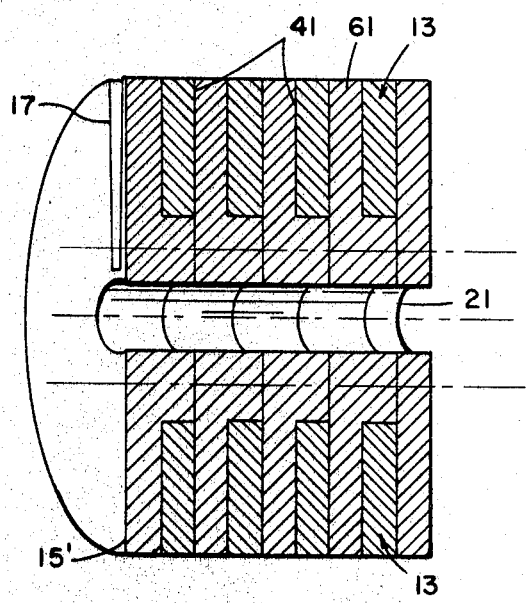
FIGURE 4 is a partial cross-section of the flux concentrator of this invention having individual, primary, pre-fabricated coils interposed between a plurality of coaxial discs forming a secondary cylinder.
Figures 5A, 5B, 5C:
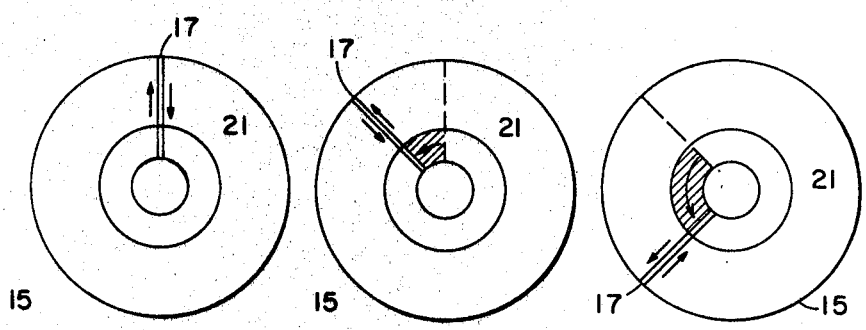
Figure 6:
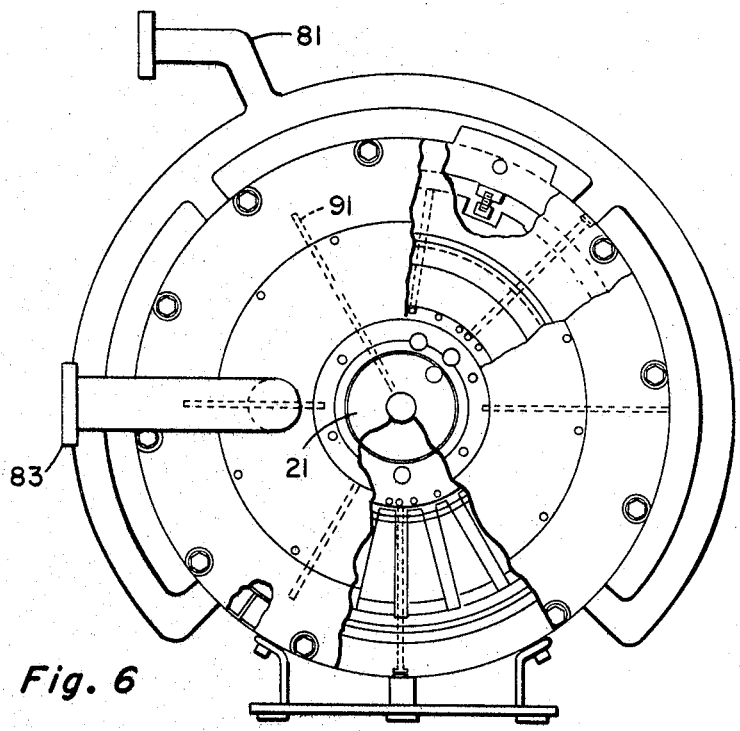
Figure 7:
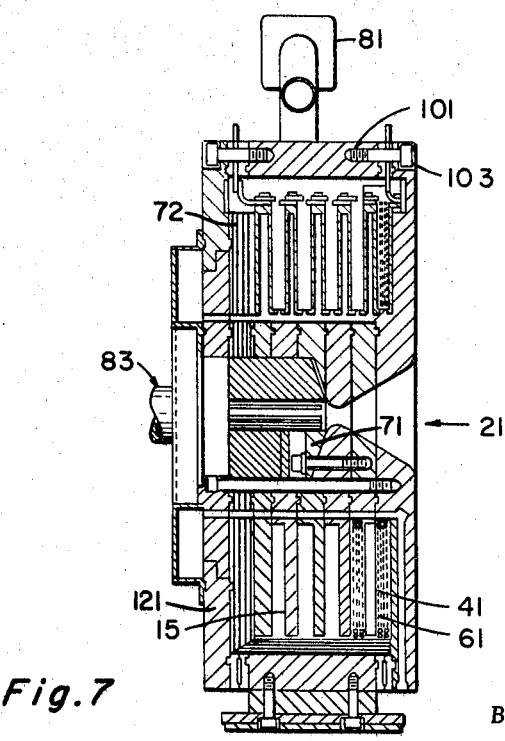

FIGURE 5a, 5b, and 5c are partial, sequential, cross-sections of FIGURE 4 showing the relative position of various discs thereof along its axis;

FIGURE 6 is partial end view of a practical embodiment of the flux concentrator of FIG. 4 adapted for experimental measurement of the magnetic moment of the short-lived $\Lambda$ hyperon;

FIGURE 7 is a partial cross-section of the flux concentrator of FIGURE 5.

Figure 1:
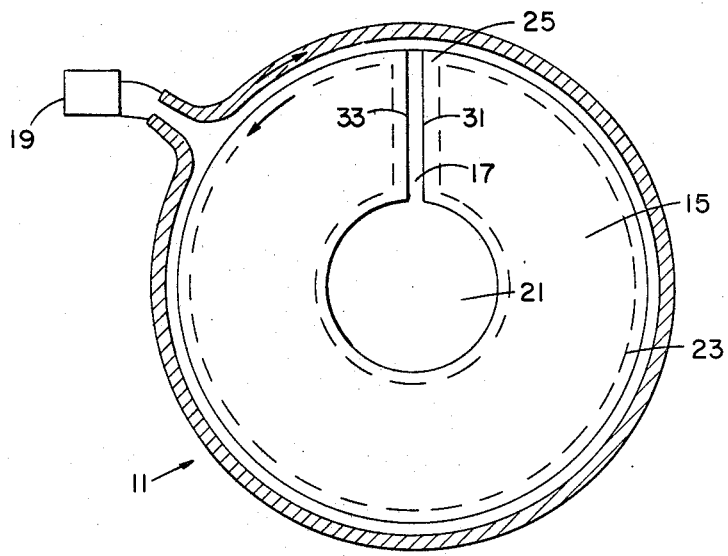
FIGURE 1 is a partial end view of a simple flux concentrator configuration.

Referring to FIGURE 1 the use of flux concentrators, such as concentrator 11, having a primary winding 13, a flux concentrator secondary 15 forming slits 17 therein, and a suitable power source 19 are useful in producing high magnetic fields up to 150 koe. or more. Flux concentrator magnets, in accordance with this invention, are particularly useful in the field of physics, where high magnetic fields in small volumes of conventional and/or unusual shapes are required. One such application is in the experimental measurement of the magnetic moment of short-lived $\Lambda$ hyperons. In accordance with this invention, for example, a 100–150 koe. field is produced in a 90 cm.³ volume having a combination cylinder and frustroconical shape in which the throat of the cylinder and small frustrum top have a 2.3 cm. diameter, 1.5 cm. long, and the frustrum has an altitude of 7 cm. with a side making a cone of 30° half angle and with a base 10.4 cm. in diameter. This field is held constant to ±10% for 30 to 50 milliseconds and pulsed at rates up to every 2½ sec. in synchronism with our accelerator, such as the Cosmotron or AGS at the Brookhaven National Laboratory.

The primary winding 13 of $n$ turns is wrapped around the periphery of the flux concentrator secondary 15. If a current, I from source 19, is applied to the primary 13 in a clockwise sense, an image current of magnitude $nI$ is induced in a counter-clockwise sense on the periphery of the disc 15. The radial slit 17 forces the induced current to circulate in a clockwise sense around the annulus or central hole 21 according to the formula:

$$H = \mu_0 \times \frac{N_2 I_2 \lambda}{a_1} F(\alpha, \beta)$$

In this formula $N_2 I_2$ is the applied ampere turns to the metallic cylinder 15; $a$ is the bore radius; $\mu_0$ is the permeability of vacuum; $\lambda$ is the space factor; $\alpha$ and $\beta$ are geometric parameters; F is a function that combines the geometric parameters; and H is the magnetic field induced in the center of the bore 21. Because the number of turns in the secondary 15 is one, the current in this secondary 15 is: $I_2 = (N_1/N_2) \times I_1 = N_1 I_1$ and $N_2 = 1$. For example, if the current in the primary winding 13 is 100 amps in a primary winding 13 having 10 turns, the current flowing in cylinder 15 around bore 21 is 1000 amps. Thus, the field in the bore 21 is much higher in the bore 21 than by the primary winding 13 alone. In this regard, the current is flowing due to the frequency of the primary current only in surface sheets 23 and the area between these current sheets 23 is not filled by any field.

It has been found that the axial induction at the center is greater by the ratio $(R/r)$ than the induction due to the primary alone (for a disc 15 of thickness $\ll r$). The configuration can be viewed as a transformer in which the periphery 25 of the disc 15 is a single turn secondary coupled to the $n$ turn primary 13, the radial slit 17 forming two secondary leads to the single turn central loop, which is the load. It has also been found that there is inductive coupling directly between the primary 13 and the central loop 15.

The concentrator disc 15 may also be thought of as a diamagnetic region that tends substantially to exclude flux whereby substantially all of the flux linking the primary 13 tends to be constrained to pass through the central hole 21 in the disc 15, an "exterior" region because of the radial cut 17. The magnetic pressure which is 6000 p.s.i. at 100 koe., tends to expand the central hole 21, which is constrained by the solid single-turn conductor 15. It will be understood, therefore, that the flux concentration is obtained by sacraficing electrical efficiency. Added to the ohmic losses of the central loop are the ohmic losses of the primary windings, the secondary disc periphery 25, and the split edges 31 and 33 of the secondary leads.

Figure 2:
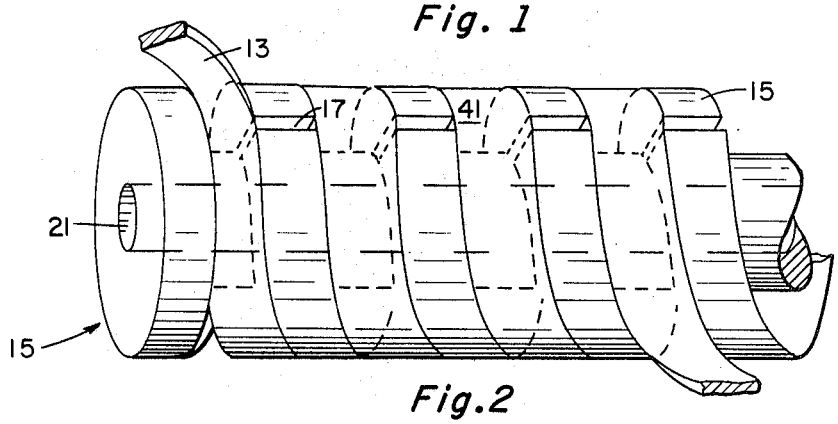
FIGURE 2 is a partial three dimensional view of apparatus embodying the flux concentrator concept of FIGURE 1 with helical threads or grooves cut into the metallic, cylindrical secondary thereof with a primary imbedded therein.

In understanding this invention, reference is made to FIG. 2. As shown in FIG. 2, the above-mentioned loss problem is reduced by subdividing the primary winding 13 and inter-leaving it with the secondary 15. Thus the primary current is dispersed through the concentrator volume to reduce the useless energy stored in the primary leakage inductance. Consequently, the magnetic forces acting on the primary 13 are reduced.

As shown in FIGURE 2 a threaded groove 41 cut into the metallic cylinder 15 can accommodate the primary winding 13. As far as the primary winding 13 is thereby completely imbedded into the secondary winding the forces on the conductors 13 and 15 is small and the coupling between the primary 13 and secondary 15 is high. However, the number of helices cut into the cylinder 15 determines the number of turns and the field depends on the proper ampere turns supplied by the current in primary 13. Also, the pulse frequency and duration are set by the given configuration.

Figure 3:
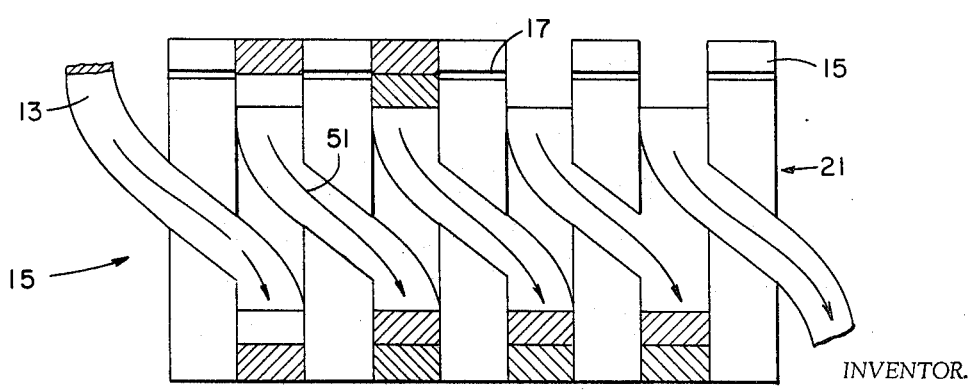
FIGURE 3 is a partial cross-section of apparatus corresponding to FIGURE 2 with the radial slits in the cylinder connected by means of cuts between grooves to allow the primary to go from one slit to another.

Referring now to FIGURE 3, the radial slits 17 may be connected by axial slots 51 between grooves 41 to allow the conductor 13 to go in one direction from one slit 17 to the next respective adjacent slit 17. This conductor from slit to slit provides versatility of application and usable short or long pulses. This configuration and the configuration of FIGS. 1 and 2, however, require the primary winding to be wound into the metallic cylinder 15. Also, the path of the secondary current in the outer section is interrupted by the axial slots 51 between grooves 41.

In accordance with the embodiment shown in FIG. 4 this invention overcomes the heretofore known problems in a combination having the advantages of high coupling between the primary and secondary versatility for a broad range of applications, field strengths, power sources, field shapes, and pulsing duration and rates, and the advantage of ease of assembly and interchangeability of pre-fabricated parts. To this end this invention provides a plurality of stacked co-axial discs 15 forming grooves 41 therebetween, and pre-fabrication coils 61 placed into each disc in each respective groove 41. These discs 15' can be put together in any shape desired. Moreover, the number of turns and the primary winding 13 can be matched to any power supply because this solution is not dependent on the grooves 41 of cylinder 15.

Referring to FIGURE 4 the connections for the flux concentrator magnet 11 of this invention, are made externally as in any normal electromagnet. These connections to source 19 tend to produce secondary currents flowing on both sides of the radial slit 17 between the ID and OD of concentrator discs 15 but the large or increased axial length of slits 17, possible in accordance with this invention, provide low ohmic losses reduced by about an order of magnitude or more over those possible heretofore. Moreover, the axial length of the slits 17 have a form whereby the ratio of the length of slits 17 to the length of all the discs 15 is small. It is noted that this permits connection between double pancakes 61 placed in each groove 41 in the outside of the flux concentrator 11 where the magnetic forces are small. This is extremely difficult or impossible in conventional apparatus but is easily provided in accordance with this invention, where in one embodiment, the spacing between the two radial slits is insulated as the current flows in a path illustrated in FIGS. 5a, 5b and 5c. Thus the loss factor and the force per unit length are thereby reduced.

In a practical embodiment of this invention shown in FIG. 6 the slits 17 are prevented from opening, in accordance with this invention, in opposition to the magnetic force in bore 21 tending to open these slits 17 by a stainless steel lock 71 in the region of maximum field. This lock 71 grabs into the secondary conductor 15 to keep the slit from opening while holding all the discs 15 together.

The concentrator 11 of this invention also employs a laminated iron core 72 outside the flux concentrator and in the not used part of the bore 21, as shown in FIG. 6. This provides for another 8–10% increase in the field due to the iron therein.

From actual tests, it has been shown that the coupling factor between the primary 13 and secondary 15 of this embodiment of this invention shown in FIGS. 6 and 7 is better than 80%.

Advantageously the materials for discs 15 with the smallest bore comprise Cr-copper and the others from electrolytic copper. Other high strength alloys in the regions of high fields, comprise Be-copper or Zr-copper. High conductivity copper in regions of lower fields provide high efficiency. Moreover, the cooling of the flux concentrator 11 with liquid nitrogen, which is circulated in magnet 11 through pipes 81 and 83 provides higher efficiency than was possible heretofore.

Advantageously, the embodiment shown in FIGURES 6 and 7 is assembled from six forged, hard Cr-copper discs 15', each 18" in diameter. These discs are 0.44" thick at the outer edge, with a raised central hub of 1.25" thickness and 8" diameter. Each disc 15' has a central hole 21 of the appropriate diameter and taper to give the cylindrical and frustro-conical shape described above. Each disc 15' also has an insulating slit 91 extending the full radius, 12 holes 101 for axial clamping screws 103, and ¼" diameter cooling passages 81 and 83.

The coils 61 are wound of rectangular OFHC copper wire, 0.187" x 0.150" in cross-section, in a two-layer spiral (26 turns per layer) with a cross-over at the inner diameter and terminals at the outside. Glass cloth between the turns and the layers provides insulation. Also, glass cloth impregnated with epoxy resin tightly encapsulates the circumference of the coils 61. However, the large flat surfaces of the winding 13 in coils 61 directly contacts the coolant in pipes 81 and 83. Laminated glass fiber radial spacers separate these cooled surfaces from the concentrator discs 15.

The concentrator discs 15' stack together in interleaved fashion while screws 103 tightly hold them in position with their radial slits 17 rotated 60° from adjacent slit to slit in adjacent discs 15'. Insulating sectors on the contacting surfaces make the insulated cut continuous through the stack of discs 15'. This construction increases the reluctance of the flux leakage path through the slits 17. The contacting surfaces in the central hubs have lapped and silver plated finishes for accurate fit. Stainless steel ring 121 surrounds the stack assembly and seals with the opposite end discs 15′ by means of compressed neoprene O-rings confined in suitable O-ring grooves. The coil terminals come out through slit copper rings sandwiched between, and epoxy bonded to, insulating rings of glass fiber.

Liquid nitrogen provides the cryogenic coolant in which a centrifugal pump circulates the liquid nitrogen in a closed loop through magnet 11 and thence to an external heat exchanger at a pressure of 20 to 50 p.s.i. and a flow rate of 35 gal. per minute. The heat exchanger is immersed in a large dewar containing liquid nitrogen boiling at atmospheric pressure.

A 2400 volt power line of 4 megawatt capacity proved economic to power magnet 11 from source 19. A simple transformer-rectifier operates in source 19 from a 2400 volt, 3 phase, 60-cycle line to deliver rectified output pulses of typically 600 volts, 3800 amps, and 50 millisecond duration. Low level control pulses triggered thyratrons, which in turn, triggered ignitron rectifiers to control the pulse duration and repetition rate. A damper ignitron and resistor were included to absorb energy stored in magnet 11. Suitable transformer taps adjusted the supply output, comprising an unfiltered six-phase rectified wave.

In operation, the peak power density in the central region 21 is about 8100 watts per cm.$^3$ and since total cooling during the pulse is low, a temperature of 140° K. during a 50 msec. pulse can be encountered. In actual tests the peak amp-turn density in the central region is 61% of the total current at 120 koe. and about 53% of the total current at 200 koe. The coupling factor between the primary 13 and secondary 15 has been determined to be 0.92. Actual tests have shown coupling of at least 90%.

The magnet of this invention has the advantage of producing high magnetic fields in a large variety of small and unusual shaped spaces. Moreover, the magnet and flux concentrator of this invention have versatility for a wide range of applications, pulse lengths and repetitions, magnetic field strengths and power sources. In actual tests the magnet and flux concentrator of this invention has survived 400,000 pulses at a peak power input of 1.6 megawatts, a peak current of 3850 amps with a primary winding of 208 turns, pulse duration of 50 milliseconds having a high field duration above 80% of pk. for 40 milliseconds, a repetition rate of 1 pulse per 3 seconds, an average power input of 24 kilowatts, an energy input of 73 kilojoules/pulse and a field of at least 100 koe.

What is claimed is:

1. A flux concentrator magnet having primary and secondary windings for producing a high magnetic field in the bore thereof, comprising a plurality of stacked secondary discs forming radial slits that are sequentially spaced in progressive rotation from each other, and prefabricated coils between each disc that are selectively removable from said discs by the unstacking of said discs.

2. The invention of claim 1 in which said discs are provided with stainless steel clamping means for selectively unstacking said discs and alternately stacking said discs to resist the tendency of said high magnetic field to expand the bore thereof.

3. The invention of claim 1 in which said radial slits in said discs are sequentially spaced progressively in rotation from one another by 60°.

4. The invention of claim 1 in which said flux concentrator magnet has a laminated iron core outside the flux concentrator magnet and in a portion of the bore thereof to increase the field in said bore, and said primary winding has cryogenic cooling means in contact therewith.

References Cited

UNITED STATES PATENTS 3,124,726   3/1964   Howland _____ 335—282

BERNARD A. GILHEANY, *Primary Examiner.*

GEORGE HARRIS, *Examiner.*